(12) United States Patent
Yang et al.

(10) Patent No.: US 7,129,303 B2
(45) Date of Patent: Oct. 31, 2006

(54) METHOD FOR PRODUCING HOMO- AND CO-POLYMERS OF ETHYLENE

(75) Inventors: Chun-Byung Yang, Daejon (KR); Won-Young Kim, Daejon (KR); Weon Lee, Daejon (KR)

(73) Assignee: Samsung Atofina Co., Ltd., Chungnam (KR)

( * ) Notice: Subject to any disclaimer, the term of this patent is extended or adjusted under 35 U.S.C. 154(b) by 286 days.

(21) Appl. No.: 10/416,359

(22) PCT Filed: Nov. 9, 2001

(86) PCT No.: PCT/KR01/01903

§ 371 (c)(1),
(2), (4) Date: Oct. 27, 2003

(87) PCT Pub. No.: WO02/38624

PCT Pub. Date: May 16, 2002

(65) Prior Publication Data

US 2004/0063875 A1    Apr. 1, 2004

(30) Foreign Application Priority Data

Nov. 9, 2000    (KR) ............................... 2000-66412

(51) Int. Cl.
*C08F 4/42* (2006.01)
(52) U.S. Cl. ............... 526/128; 526/123.1; 526/125.1; 526/124.3; 526/142; 526/348; 502/115; 502/120; 502/125; 502/126; 502/127; 502/103
(58) Field of Classification Search ............ 526/123.1, 526/128, 125.1, 124.3, 142, 348; 502/115, 502/120, 125, 126, 127, 103
See application file for complete search history.

(56) References Cited

U.S. PATENT DOCUMENTS

| | | | |
|---|---|---|---|
| 3,332,927 A | 7/1967 | Cottingham |
| 3,632,620 A | 1/1972 | Kober et al. |
| 3,642,746 A | 2/1972 | Kashiwa et al. |
| 3,642,772 A | 2/1972 | Haid et al. |
| 3,878,124 A | 4/1975 | Durand et al. |
| 3,899,477 A | 8/1975 | Altemore et al. |
| 3,953,414 A | 4/1976 | Galli et al. |
| 4,013,823 A | 3/1977 | Longi et al. |
| 4,069,169 A | 1/1978 | Toyoda et al. |
| 4,071,672 A | 1/1978 | Kashiwa |
| 4,071,674 A | 1/1978 | Kashiwa et al. |
| 4,076,924 A | 2/1978 | Toyota et al. |
| 4,085,276 A | 4/1978 | Toyota et al. |
| 4,107,413 A | 8/1978 | Giannini et al. |
| 4,107,414 A | 8/1978 | Giannini et al. |
| 4,107,415 A | 8/1978 | Giannini et al. |
| 4,111,835 A | 9/1978 | Foschini et al. |
| 4,148,756 A | 4/1979 | Langer, Jr. |
| 4,156,063 A | 5/1979 | Giannini et al. |
| 4,157,435 A | 6/1979 | Toyota et al. |
| 4,158,642 A | 6/1979 | Langer, Jr. |
| 4,187,196 A | 2/1980 | Giannini et al. |
| 4,220,554 A | 9/1980 | Scatt et al. |
| 4,226,963 A | 10/1980 | Giannini et al. |
| 4,235,747 A | 11/1980 | Leung |
| 4,263,169 A | 4/1981 | Scata et al. |
| 4,277,372 A | 7/1981 | Matlack |
| 4,315,835 A | 2/1982 | Scatt al. |
| 4,315,874 A | 2/1982 | Ushida et al. |
| 4,330,649 A | 5/1982 | Kioka et al. |
| 4,336,360 A | 6/1982 | Giannini et al. |
| 4,355,143 A | 10/1982 | Lassalle et al. |
| 4,380,507 A | 4/1983 | Noristi et al. |
| 4,384,983 A | 5/1983 | Hoff |
| 4,390,671 A | 6/1983 | Imai et al. |
| 4,399,054 A | 8/1983 | Ferraris et al. |
| 4,401,589 A | 8/1983 | Kioka et al. |
| 4,417,019 A | 11/1983 | Yamamoto et al. |
| 4,434,282 A | 2/1984 | Esneault |
| 4,439,540 A | 3/1984 | Cecchin et al. |

(Continued)

FOREIGN PATENT DOCUMENTS

DE    2553104    6/1977

(Continued)

OTHER PUBLICATIONS

International Search Report PCT/KR01/01903, mailed Jan. 10, 2002.

(Continued)

*Primary Examiner*—Ling-Sui Choi
(74) *Attorney, Agent, or Firm*—Meyertons, Hood, Kivlin, Kowert & Goetzel, P.C.; Eric B. Meyertons

(57) ABSTRACT

The present invention provides a method for producing homo- and co-polymers of ethylene, or more particularly a method for producing homo- and copolymers of ethylene in the presence of (a) a solid titanium catalyst produced by preparing a magnesium solution by contact-reacting a halogenated magnesium compound with an alcohol; reacting thereto an ester compound having at least one hydroxyl group and a silicon compound having at least one alkoxy group; and adding a mixture of a titanium compound and a silicon compound; (b) organometallic compounds of Group II or III of the Periodic Table; and (c) an alkoxysilane compound and a haloalkne compound. The catalyst for homo- and co-polymerization of ethylene, produced according to the present invention, exhibits a high activity and the polymers produced by the method of the present invention using said catalyst have the advantages of exhibiting a high bulk density and a narrow molecular weight distribution.

16 Claims, No Drawings

U.S. PATENT DOCUMENTS

| | | | |
|---|---|---|---|
| 4,473,660 A * | 9/1984 | Albizzati et al. | 502/124 |
| 4,477,639 A | 10/1984 | Nielsen | |
| 4,482,687 A | 11/1984 | Noshay et al. | |
| 4,487,846 A | 12/1984 | Bailly et al. | |
| 4,514,513 A | 4/1985 | Sato et al. | |
| 4,518,706 A | 5/1985 | Gessell | |
| 4,529,716 A | 7/1985 | Banzi et al. | |
| 4,579,833 A | 4/1986 | Collomb et al. | |
| 4,613,655 A | 9/1986 | Longi et al. | |
| 4,614,727 A | 9/1986 | Longi et al. | |
| 4,615,831 A | 10/1986 | Kanno et al. | |
| 4,642,328 A | 2/1987 | Morterol et al. | |
| 4,673,719 A | 6/1987 | Kioka et al. | |
| 4,729,854 A | 3/1988 | Miyata et al. | |
| 4,761,392 A | 8/1988 | Shiga et al. | |
| 4,777,639 A | 10/1988 | Whitehouse | |
| 4,806,433 A | 2/1989 | Sasaki et al. | |
| 4,816,433 A | 3/1989 | Terano et al. | |
| 4,829,037 A | 5/1989 | Terano et al. | |
| 4,843,049 A | 6/1989 | Invernizzi et al. | |
| 4,847,227 A | 7/1989 | Murai et al. | |
| 4,847,639 A | 7/1989 | Sugata et al. | |
| 4,866,022 A | 9/1989 | Arzoumanidis et al. | |
| 4,912,074 A | 3/1990 | Miro | |
| 4,946,816 A | 8/1990 | Cohen et al. | |
| 4,952,649 A | 8/1990 | Kioka et al. | |
| 4,962,167 A | 10/1990 | Shiraishi et al. | |
| 4,970,186 A | 11/1990 | Terano et al. | |
| 4,978,648 A | 12/1990 | Barb | |
| 4,988,656 A | 1/1991 | Arzoumanidis et al. | |
| 4,990,479 A | 2/1991 | Ishimaru et al. | |
| 5,006,499 A | 4/1991 | Daire | |
| 5,013,702 A | 5/1991 | Arzoumanidis et al. | |
| 5,021,382 A | 6/1991 | Malpass, Jr. | |
| 5,059,570 A | 10/1991 | Bailly et al. | |
| 5,061,667 A | 10/1991 | Murata et al. | |
| 5,064,798 A | 11/1991 | Chang | |
| 5,081,090 A | 1/1992 | Arzoumanidis et al. | |
| 5,104,838 A | 4/1992 | Fujita et al. | |
| 5,106,807 A | 4/1992 | Morini et al. | |
| 5,124,297 A | 6/1992 | Arzoumanidis et al. | |
| 5,130,284 A | 7/1992 | Terano et al. | |
| 5,134,104 A | 7/1992 | Sasaki et al. | |
| 5,175,332 A | 12/1992 | Chatterton et al. | |
| 5,182,245 A | 1/1993 | Arzoumanidis et al. | |
| 5,218,052 A | 6/1993 | Cohen et al. | |
| 5,244,996 A | 9/1993 | Kawasaki et al. | |
| 5,346,872 A | 9/1994 | Menon et al. | |
| 5,419,116 A | 5/1995 | Rast et al. | |
| 5,438,110 A | 8/1995 | Ishimaru et al. | |
| 5,439,995 A | 8/1995 | Bailly et al. | |
| 5,455,316 A | 10/1995 | Tsutsui et al. | |
| 5,459,116 A | 10/1995 | Ro et al. | |
| 5,498,770 A | 3/1996 | Hoaska et al. | |
| 5,502,128 A | 3/1996 | Flores et al. | |
| 5,585,317 A | 12/1996 | Sacchetti et al. | |
| 5,587,436 A | 12/1996 | Klimek et al. | |
| 5,587,440 A | 12/1996 | Ehlers et al. | |
| 5,618,886 A | 4/1997 | Shinozaki et al. | |
| 5,629,390 A | 5/1997 | Nishimura et al. | |
| 5,643,845 A | 7/1997 | Tajima et al. | |
| 5,696,044 A | 12/1997 | Zakharov et al. | |
| 5,726,261 A | 3/1998 | Sacchetti et al. | |
| 5,780,378 A | 7/1998 | Toida et al. | |
| 5,798,424 A | 8/1998 | Kong et al. | |
| 5,817,591 A | 10/1998 | Shamshoum et al. | |
| 5,844,046 A | 12/1998 | Ohgizawa et al. | |
| 5,849,654 A | 12/1998 | Fushimi et al. | |
| 5,849,655 A | 12/1998 | Shamshoum et al. | |
| 5,869,418 A | 2/1999 | Iiskola et al. | |
| 5,877,265 A | 3/1999 | Toida et al. | |
| 5,880,056 A | 3/1999 | Tsutsui et al. | |
| 5,936,049 A | 8/1999 | Kojoh et al. | |
| 5,948,872 A | 9/1999 | Kioka et al. | |
| 5,965,478 A | 10/1999 | Goto et al. | |
| 5,968,862 A | 10/1999 | Abbott et al. | |
| 6,028,149 A | 2/2000 | Luciani et al. | |
| 6,034,025 A | 3/2000 | Yang et al. | |
| 6,066,702 A | 5/2000 | Ro et al. | |
| 6,111,038 A | 8/2000 | Kioka et al. | |
| 6,114,276 A | 9/2000 | Kong et al. | |
| 6,214,759 B1 | 4/2001 | Chang et al. | |
| 6,218,331 B1 | 4/2001 | DiMaio et al. | |
| 6,235,854 B1 | 5/2001 | Kioka et al. | |
| 6,291,385 B1 * | 9/2001 | Lee et al. | 502/111 |
| 6,323,150 B1 | 11/2001 | Kojoh et al. | |
| 6,482,764 B1 | 11/2002 | Chang et al. | |
| 6,521,560 B1 | 2/2003 | Kojoh et al. | |
| 6,537,942 B1 | 3/2003 | Shinozaki et al. | |
| 6,559,250 B1 | 5/2003 | Ro et al. | |
| 2001/0031694 A1 | 10/2001 | Yang et al. | |
| 2002/0037980 A1 | 3/2002 | Yang et al. | |
| 2002/0045537 A1 | 4/2002 | Yang et al. | |
| 2002/0120079 A1 | 8/2002 | Ro et al. | |

FOREIGN PATENT DOCUMENTS

| | | | |
|---|---|---|---|
| DE | 3636060 | | 5/1988 |
| EP | 0 008 307 | | 3/1980 |
| EP | 0131832 | | 7/1984 |
| EP | 0 303 704 | * | 2/1989 |
| EP | 0350170 | | 1/1990 |
| EP | 0385765 | | 9/1990 |
| EP | 0 391 336 | | 10/1990 |
| EP | 0602922 | | 6/1994 |
| EP | 0 607 703 | | 7/1994 |
| EP | 0606125 | | 7/1994 |
| EP | 0607703 | | 7/1994 |
| EP | 0669347 | | 8/1995 |
| GB | 1335887 | | 10/1973 |
| GB | 1492618 | | 1/1975 |
| GB | 1577643 | | 10/1980 |
| JP | 51136625 | | 11/1976 |
| JP | 52-111528 | | 9/1977 |
| JP | 52111528 | | 9/1977 |
| JP | 59-064602 | | 4/1984 |
| JP | 59-145206 | | 8/1984 |
| JP | 59145206 | | 8/1984 |
| JP | 61055103 | | 3/1986 |
| JP | 61268704 | | 11/1986 |
| JP | 62081405 | | 4/1987 |
| JP | 63-199703 | | 8/1988 |
| JP | 63199703 | | 8/1988 |
| JP | 63-191811 | | 9/1988 |
| JP | 63-54004 | | 10/1988 |
| JP | 63308003 | | 12/1988 |
| JP | 1242605 | | 9/1989 |
| JP | 2240145 | | 9/1990 |
| JP | 2-300206 | | 12/1990 |
| JP | 06-340711 | | 5/1993 |
| JP | 07-330675 | | 8/1995 |
| JP | 7242706 | | 9/1995 |
| JP | 8109215 | | 4/1996 |
| JP | 9165478 | | 6/1997 |
| JP | 09176226 | | 7/1997 |
| JP | 2000191845 | | 7/2000 |
| KR | 1020010084520 | | 9/2001 |
| WO | WO 9844009 | | 10/1998 |
| WO | WO 00/73355 | | 7/2000 |
| WO | WO 00/73355 | | 12/2000 |
| WO | WO 01/32718 | | 5/2001 |
| WO | WO 01/78687 | | 10/2001 |
| WO | WO 02/38619 | | 5/2002 |
| WO | WO 02/38620 | | 5/2002 |

| WO | WO 02/38622 | 5/2002 |
| WO | WO 02/38623 | 5/2002 |
| WO | WO 02/48206 | 6/2002 |
| WO | WO 02/051882 | 7/2002 |
| WO | WO 02/051933 | 7/2002 |
| WO | WO 02/051934 | 7/2002 |
| WO | WO 02/052059 | 7/2002 |
| WO | WO 03/000747 | 1/2003 |
| WO | WO 03/000747 | 3/2003 |

OTHER PUBLICATIONS

Wen et al. "Mechanics of Fluidization" Chemical Engineering Progress Symposium Series, 1962, vol. 62, 100-111.

Edelmann, "N-silylated benzamidines: versatile building blocks in main group and coordination chemistry," Coordination Chemistry Reviews, vol. 137, 1994, pp. 403-481.

Stokes et al., "Reactions of Cobaloxime Anions and/or Hydrides with Enynes as a New, General Route to 1, 3- and 1,2-Dienylcobaloxime Complexes," Organometallics, 1996, vol. 15, pp. 2624-2632.

Zhou et al., "Synthesis and Structure of Novel Bridged Dinuclear Indium Complexes," Inorg. Chem., 1996, vol. 35, pp. 1423-1424.

Tinkler et al., "Polymerisation of ethene by the novel titanium complex [Ti(Me3SiNCH2CH2NsiMe3)CI2]; a metallocene analogue," Chem. Commun., 1996, pp. 2623-2624.

Linden et al., "Polymerization of a-Olefins and Butadiene and Catalytic Cyclotrimerization of 1-Alkynes by a New Class of Group IV Catalysts. Control of Molecular Weight and Polymer Microstructure via Ligand Tuning in Sterically Hindered Chelating Penoxide Titanium and Zirconium Species," J. Am. Chem. Soc., 1995, vol. 117, pp. 3008-3021.

Zhou et al., "Bulky Amidinate Complexes of Tin(IV). Synthesis and Structure of Sn(RNC(R')NR)2C22 (R = Cyclohexyl, R' = H, Me; R = SiMe3, R' = tBu)," Inorg. Chem., 1997, vol. 36, pp. 501-504.

Averbuj et al. "Stereoregular Polymerization of a-Olefins Catalyzed by Chiral Group 4 Benzamidinate Complexes of C1 and C3 Symmetry" J. Am. Chem. Soc,1998, vol. 120, 8640-8646.

* cited by examiner

METHOD FOR PRODUCING HOMO- AND CO-POLYMERS OF ETHYLENE

BACKGROUND OF THE INVENTION

1. Field of the Invention

The present invention provides a method for producing homo- and co-polymers of ethylene, or more particularly a method for producing homo- and copolymers of ethylene by using a catalyst with high activity to produce said polymers with high bulk density and narrow molecular weight distributions.

2. Description of the Related Art

Catalysts containing magnesium for polymerization or copolymerization of ethylene are known to have very high catalytic activities and to produce polymers with high bulk density and are suitable for use in liquid phase or gas phase polymerizations. Liquid phase polymerization of ethylene denotes a polymerization process performed in a medium such as bulk ethylene, isopentane, or hexane. Important characteristics of catalysts used in this process include high catalytic activity, production of a reasonable bulk density of the resultant polymers, etc. Of these characteristics, catalytic activity is deemed to be the most important.

Many titanium-based catalysts containing magnesium for olefin polymerization, and the manufacturing methods thereof have been reported. Many processes that use magnesium solutions to produce catalysts capable of generating olefin polymers with a high apparent bulk density are known. A magnesium solution may be obtained by reacting magnesium compounds with electron donors such as alcohols, amines, cyclic ethers, or organic carboxylic acids in the presence of a hydrocarbon solvent. The use of an alcohol as an electron donor is disclosed in U.S. Pat. Nos. 4,330,649 and 5,106,807. Further, methods for the production of catalysts containing magnesium by reacting a liquid-phase magnesium solution with a halogenated compound such as titanium tetrachloride are well known. Moreover, there have been attempts to control polymerization activity or molecular weight distribution by adding ester compounds. Such catalysts produce polymers with a high bulk density; however, improvements can still be made with respect to catalytic activity and molecular weight distribution of the resulting polymers. Moreover, tetrahydrofuran, a cyclic ester, has been used as a solvent for magnesium compounds in U.S. Pat. Nos. 4,477,639 and 4,518,706.

U.S. Pat. Nos. 4,847,227, 4,816,433, 4,829,037, 4,970,186, and 5,130,284 have reported the use of electron donors such as dialkylphthalate, phthaloyl chloride, etc. in reactions with a titanium chloride compound in the production of olefin polymerization catalysts. These catalysts display superior polymerization activity and are also capable of enhancing the bulk density of the resulting polymers.

U.S. Pat. No. 5,459,116 teaches a method of production of a titanium solid catalyst by contact-reacting a magnesium solution containing an ester having at least one hydroxyl group as an electron donor with a titanium compound. By this method, it is possible to obtain a catalyst with high polymerization activity, which also produces high bulk density to the resulting polymers; however, there is still room for further improvement.

With respect to polymerization of α-olefins, particularly, with respect to polymerization of propylene, the art of using external electron donors for increasing stereo-regularity is commonly known in the field and is widely used in the industry. As for external electron donors, alkoxy silane compounds are widely known. However, in these cases, the stereo-regularity of polymers increases, but the molecular weight distribution broadens in relative terms. Korean Patent Notification No. 93-665 discloses a method of broadening the molecular weight distribution by using an organic silane as an external electron donor during polymerization of propylene, and the benefits thereof.

SUMMARY OF THE INVENTION

The objective of the present invention is to provide a method for producing homo- and co-polymers of ethylene by using catalysts with superior catalytic activity, wherein said polymers have high bulk densities and narrow particle size distributions. More particularly, the present invention provides a method for producing homo- and copolymers of ethylene, having narrow molecular weight distributions of polymers, which involves controlling the particle morphology of polymers and using catalysts with high polymerization activity.

Still other objectives and the utility of the present invention will become apparent as references are made with respect to the following descriptions and the claims thereto.

DETAILED DESCRIPTION OF THE PREFERRED EMBODIMENTS

The method for producing homo- and co-polymers of ethylene according to the present invention includes carrying out homo- or co-polymerization of ethylene in the presence of the following:
  (a) a solid complex titanium catalyst produced by a simple yet efficient manufacturing process using magnesium, titanium, halogen, and electron donors, which includes:
    (i) preparing a magnesium solution by contact-reacting a halogenated magnesium compound with an alcohol;
    (ii) reacting said solution with an ester compound having at least one hydroxyl group and a silicone compound having at least one alkoxy group; and
    (iii) adding a mixture of a titanium compound and a silicon compound;
  (b) organometallic compounds of Groups II or III of the Periodic Table; and
  (c) an alkoxysilane compound and a haloalkane compound.

The types of halogenated magnesium compounds used for producing catalysts used in the present invention include di-halogenated magnesiums such as magnesium chloride, magnesium iodide, magnesium fluoride, and magnesium bromide; alkymagnesium halides such as methylmagnesium halide, ethylmagnesium halide, propylmagnesium halide, butylmagnesium halide, isobutylmagnesium halide, hexylmagnesium halide, and amylmagnesium halide; alkoxymagnesium halides such as methoxymagnesium halide, ethoxymagensium halide, isopropoxymagnesium halide, butoxymagnesium halide, octoxymagnesium halide; and aryloxymagnesium halides such as phenoxymagnesium halide and methyl-phenoxymagnesium halide. Of the magnesium compounds described above, two or more compounds can be used in a mixture. Further, the magnesium compounds described above can be effectively used in the form of a complex compound with other metals.

Of the compounds listed above, some can be represented by a simple formula, but others cannot be so represented depending on the production methods of the magnesium compounds. In the latter cases, the magnesium compounds can generally be regarded as a mixture of some of the listed compounds. For example, the following compounds can be used in the present invention: compounds obtained by reacting magnesium compounds with polysiloxane compounds, silane compounds containing halogen, ester, or alcohol; and compounds obtained by reacting magnesium metals with alcohol, phenol, or ether in the presence of halosilane, phosphorus pentachloride, or thionyl chloride. However, the preferable magnesium compounds are magnesium halides, especially magnesium chloride or alkylmagnesium chloride, preferably those having an alkyl group of 1–10 carbons; alkoxymagnesium chlorides, preferably those having 1–10 carbons; and aryloxymagnesium chlorides, preferably those having 6–20 carbons. The magnesium solution used in the present invention can be produced by using the aforementioned magnesium compounds in the presence a hydrocarbon solvent or in the absence thereof, in an alcohol solvent.

The types of hydrocarbon solvents used in the present invention may include aliphatic hydrocarbons such as pentane, hexane, heptane, octane, decane, and kerosene; alicyclic hydrocarbons such as cyclopentane, methylcyclopentane, cyclohexane, and methylcyclohexane; aromatic hydrocarbons such as benzene, toluene, xylene, ethylbenzene, cumene, and cymene; and halogenated hydrocarbons such as dichloropropane, dichloroethylene, trichloroethylene, carbon tetrachloride, and chlorobenzene.

To produce a magnesium solution containing a halogenated magnesium compound, an alcohol is used as the solvent in the presence of one or more of the aforementioned hydrocarbons or in the absence thereof. The types of alcohol which may be used include those containing 1–20 carbon atoms, such as methanol, ethanol, propanol, butanol, pentanol, hexanol, octanol, decanol, dodecanol, octadecyl alcohol, benzyl alcohol, phenylethyl alcohol, isopropyl benzyl alcohol, and cumyl-alcohol, although an alcohol containing 1–12 carbon atoms is preferable. The average size of a target catalyst and its particle distribution can vary according to the types and content of alcohol, the types of magnesium compounds, the ratio of magnesium to alcohol, etc. Nevertheless, the total amount of alcohol required to produce the magnesium solution is at least 0.5 mole per mole of magnesium compound, preferably about 1.0–20 moles per mole of magnesium compound, or more preferably about 2.0–10 moles per mole of magnesium compound.

During the production of the magnesium solution, the reaction of a halogenated magnesium compound with an alcohol is preferably carried out in the presence of a hydrocarbon medium. The reaction temperature, while variable depending on the type and amount of alcohol, is at least about −25° C., preferably about 10–200° C., or more preferably about 0–150° C. It is preferable to carry out the reaction for about 15 minutes to about 5 hours, preferably for about 30 minutes to about 4 hours.

Of the electron donors used in the production of catalysts used in the present invention, the ester compounds having at least one hydroxyl group include unsaturated aliphatic acid esters having at least one hydroxyl group, such as 2-hydroxy ethylacrylate, 2-hydroxy ethylmethacrylate, 2-hydroxypropyl acrylate, 2-hydroxypropylmethacrylate, 4-hydroxy butylacrylate, pentaerythritol triacrylate; aliphatic monoesters or polyesters having at least one hydroxyl group, such as 2-hydroxy ethyl acetate, methyl 3-hydroxy butylate, ethyl 3-hydroxy butylate, methyl 2-hydroxy isobutylate, ethyl 2-hydroxy isobutylate, methyl-3-hydroxy-2-methyl propionate, 2,2-dimethyl-3-hydroxy propionate, ethyl-6-hydroxy hexanoate, t-butyl-2-hydroxy isobutylate, diethyl-3-hydroxy glutarate, ethyl lactate, isopropyl lactate, butyl isobutyl lactate, isobutyl lactate, ethyl mandelate, dimethyl ethyl tartrate, ethyl tartrate, dibutyl tartrate, diethyl citrate, triethyl citrate, ethyl-2-hydroxy-caproate, diethyl bis-(hydroxy methyl) malonate; aromatic esters respectively having at least one hydroxyl group, such as 2-hydroxy ethyl benzoate, 2-hydroxy ethyl salicylate, methyl-4-(hydroxy methyl)benzoate, methyl 4-hydroxy benzoate, ethyl 3-hydroxy benzoate, 4-methyl salicylate, ethyl salicylate, phenyl salicylate, propyl 4-hydroxy benzoate, phenyl 3-hydroxy naphthanoate, monoethylene glycol monobenzoate, diethylene glycol monobenzoate, triethylene glycol monobenzoate; alicyclic esters having at least one hydroxyl group, such as hydroxybutyl lactone, and others. The amount of the ester compound having at least one hydroxyl group to be used should be about 0.001–5 moles per mole of magnesium, or preferably about 0.01–2 moles per mole of magnesium.

The silicon compound having at least one alkoxy group can also be used as another electron donor while producing catalysts used in the present invention. A silicon compound represented by the general formula $R_nSi(OR)_{4-n}$ (where R is a hydrocarbon having 1–12 carbons and n is an integer from 0 to 3) is preferable. In particular, the following compounds can be used: dimethyldimethoxysilane, dimethyldiethoxysilane, diphenyldimethoxysilane, methylphenylmethoxysilane, diphenyldiethoxysilane, ethyltrimethoxysilane, vinyltrimethoxysilane, methyltrimethoxysilane, phenyltrimethoxysilane, methyltriethoxysilane, ethyltriethoxysilane, vinyltriethoxysilane, butyltriethoxysilane, phenyltriethoxysilane, ethyltriisopropoxysilane, vinyltributoxysilane, ethylsilicate, butylsilicate, methyltriaryloxysilane, etc. The amount of said compound is preferably about 0.05–3 moles per mole of magnesium, or more preferably about 0.1–2 moles per mole of magnesium. The temperature for the contact-reaction of the magnesium solution, an ester compound having at least one hydroxyl group, and an alkoxy silicone compound may be about 0–100° C., or more preferably about 10–70° C.

To recrystalize the catalyst particles, the magnesium compound solution reacted with the electron donor is reacted with a mixture of a liquid titanium compound represented by the general formula of $Ti(OR)_aX_{4-a}$ (where R is a hydrocarbon group, X is a halogen atom, and a is a natural number from 0 to 4), and a compound represented by the general formula of $R_nSiCl_{4-n}$ (where R is hydrogen, an alkyl, alkoxy, haloalkyl, or aryl group having 1–10 carbons; or a halosilyl; or a halosilylalkyl group having 1–8 carbons; and n is a natural number from 0 to 3).

The types of titanium compounds which satisfy the general formula of $Ti(OR)_aX_{4-a}$ include a 4-halogenated titanium such as $TiCl_4$, $TiBr_4$, and $TiI_4$; a 3-halogenated alkoxy-titanium such as $Ti(OCH_3)Cl_3$, $Ti(OC_2H_5)Cl_3$, $Ti(OC_2H_5)Br_3$, and $Ti(O(i-C_4H_9))Br_3$; a 2-halogenated alkoxy-titanium compound such as $Ti(OCH_3)_2Cl_2$, $Ti(OC_2H_5)_2Cl_2$, $Ti(O(i-C_4H_9))_2Cl_2$, and $Ti(OC_2H_5)_2Br_2$; and a tetra-alkoxy titanium such as $Ti(OCH_3)_4$, $Ti(OC_2H_5)_4$, and $Ti(OC_4H_9)_4$. A mixture of the above titanium compounds can also be used in the present invention. However, the preferable titanium compounds are those containing halogen, or more preferably titanium tetrachloride.

The types of silicon compounds satisfying the above general formula of $R_nSiCl_{4-n}$ (where R is hydrogen, an alky, alkoxy, haloalkyl, or aryl group having 1–10 carbons; or a halosilyl; or a halosilylalkyl group having 1–8 carbons, and n is a natural number from 0 to 3) include silicon tetrachloride; trichlorosilanes such as methyltrichlorosilane, ethyltrichlorosilane, phenyltrichlorosilane; dichlorosilanes such as dimethyldichlorosilane, diethyldichlorosilane, di-phenyldichlorosilane, and methylphenyldichlorosilane; monochlorosilanes such as trimethylchlorosilane. A mixture of these silicon compounds can also be used in the present invention, or more preferably silicon tetrachloride can be used.

The amount of the mixture of a titanium compound and a silicon compound used during re-crystallization of the magnesium compound solution is about 0.1–200 moles per mole of magnesium compound, preferably about 0.1–100 moles per mole of magnesium compound, or more preferably about 0.2–80 moles per mole of magnesium compound. The molar ratio of the silicon compound to the titanium compound in the mixture is about 0.05–0.95, or more preferably about 0.1–0.8. When the magnesium compound solution is reacted with the mixture of a titanium compound and a silicon compound, the morphology and particle sizes of the recrystallized solid constituents vary a great deal according to the reaction conditions. Therefore, the reaction of the magnesium compound solution with the mixture of a titanium compound and a silicon compound should preferably be carried out at a sufficiently low temperature to result in formation of solid constituents. More preferably, the reaction should be carried out by contact-reaction at about −70–70° C., or most preferably at about −50–50° C. After the contact-reaction, the temperature is slowly raised for about 0.5–5 hours to about 50–150° C.

The solid catalyst particles obtained during the above process can be further reacted with titanium compounds. These titanium compounds are titanium halides or halogenated alkoxy titaniums with an alkoxy functional group of 1–20 carbons. At times, a mixture of these compounds can also be used. Of these compounds, however, a titanium halide or a halogenated alkoxy titanium compound having an alkoxy functional group of 1–8 carbons can be used, or more preferably a titanium tetrahalide can be used.

The catalyst produced according to the process of the present invention can be utilized for homo- or co-polymerization of ethylene. In particular, the catalyst is used in homo-polymerization of ethylene, and also in copolymerization of ethylene and an α-olefin having three or more carbons such as propylene, 1-butene, 1-pentene, 4-methyl-1-pentene, or 1-hexene.

The polymerization reaction according to the present invention involves producing homo- and co-polymers of ethylene in the presence of the following:

(a) a solid complex titanium catalyst including magnesium, titanium, halogen, and an electron donor;

(b) organometallic compounds of Groups II or III of the Periodic Table; and (c) an alkoxysilane compound and an haloalkane compound as additives.

The solid titanium catalyst can be used as a component in the polymerization reaction after pre-polymerization with ethylene or an α-olefin. The pre-polymerization can be carried out with the catalyst described above and an aluminum compound such as triethylaluminum in a hydrocarbon solvent such as hexane at a sufficiently low temperature or with ethylene or an α-olefin under pressure. The pre-polymerization controls the morphology of the catalyst particles by surrounding the catalyst particles with polymer and is helpful in producing good-quality post-polymerization morphology of the polymer product. The weight ratio of polymer to catalyst after pre-polymerization is ordinarily about 0.1:1–20:1.

The organometallic compound in the present invention can be represented by the general formula of $MR_n$, where M represents a metal constituent of Group II or IIIA in the Periodic Table such as magnesium, calcium, zinc, boron, aluminum, or gallium; R represents an alkyl group with 1–20 carbons such as a methyl, ethyl, butyl, hexyl, octyl, or decyl group; and n represents the atomic valence of the metal constituent. Preferable organometallic compounds include a trialkyl aluminum having an alkyl group of 1–6 carbons such as triethylaluminum and triisobutylaluminum, or a mixture thereof can be utilized. On occasions, an organic aluminum compound having one or more halogen or hydride groups such as ethylaluminum dichloride, diethylaluminum chloride, ethylaluminum sesquichloride, or diisobutylaluminum hydride can also be used.

In order to produce ethylene polymers with a narrow molecular weight distribution and maintain very high catalytic activity, the tertiary component additive should be an organic silicon compound having alkoxy groups, or an alkoxysilane and haloalkane compound.

The alkoxysilane compound can be represented by the general formula of $R_n Si(OR)_{4-n}$ (where R is a hydrocarbon having 1–20 carbons and n is an integer from 0 to 3). In particular, the types of alkoxysilane compounds which can be used include aromatic silanes such as diphenyldimethoxysilane, phenyltrimethoxysilane, phenylethyldimethoxysilane, and phenylmethyldimethoxysilane; aliphatic silanes such as isobutyltrimethoxysilane, diisobutyldimethoxysilane, diisopropyldimethoxysilane, di-t-butyldimethoxysilane, t-butyltrimethoxysilane, cyclohexylmethyldimethoxysilane, dicyclopentyldimethoxysilane, dicyclohexyldimethoxysilane, 2-norbornan-triethoxysilane, 2-norbornan-methyldimethoxysilane, and vinyltriethoxysilane; and mixtures thereof. In particular, among the aforementioned silane compounds, a branched alkyldialkoxysilane such as diisobutyldimethoxysilane and a cycloalkyldialkoxysilane such as dicyclopentyldimethoxysilane were shown to be effective.

A haloalkane compound is a compound having 1–20 carbon atoms and at least one halogen, or a mixture thereof can be used. Examples include monochloromethane, dichloromethane, trichloromethane, tetrachloromethane, monochloroethane, 1,2-dichloroethane, monochloropropane, monochlorobutane, monochloro-secondary-butane, monochloro-tertiary-butane, monochlorocyclohexane, chlorobenzene, monobromomethane, monobromopropane, monobromobutane, and monoiodomethane.

The polymerization reaction may be performed either in the gas phase or as a bulk polymerization in the absence of an organic solvent, or as a liquid slurry polymerization in the presence of an organic solvent. These polymerization methods, however, are performed in the absence of oxygen, water, and other compounds that may act as catalytic poisons.

For liquid phase slurry polymerization, the concentration of the solid complex titanium catalyst (a) in the polymerization reaction system is approximately 0.001–5 mmol, in terms of titanium atoms in the catalyst, per one liter of the solvent, or more preferably approximately 0.001–0.5 mmol. Solvents that can be used include alkanes such as pentane, hexane, heptane, n-octane, isooctane, cyclohexane, and methylcyclohexane; alkylaromatics such as toluene, xylene, ethylbenzene, isopropylbenzene, ethyltoluene, n-propylbenzene, and diethylbenzene; halogenated aromatics such as chlorobenzene, chloronaphthalene, and ortho-dichlorobenzene; and mixtures thereof.

For gas phase polymerizations, the amount of the solid complex titanium catalyst to be used (a) should be approximately 0.001–5 mmol, in terms of titanium atoms in the catalyst, per one liter of the polymerization reactor, preferably approximately 0.001–1.0 mmol, or more preferably approximately 0.01–0.5 mmol.

The preferable concentration of the organometallic compound (b), based on the organometallic atom, is about 1–2,000 moles per mole of titanium atoms in catalyst (a), or more preferably about 5–500 moles.

To provide a high reaction rate of polymerization, the polymerization is performed at a sufficiently high temperature regardless of the polymerization process. Generally, a temperature of approximately 20–200° C. is appropriate, or more preferably approximately 20–95° C. The appropriate pressure of monomers at the time of polymerization is about 1 atm to about 100 atm, or more preferably about 2 atm to about 50 atm.

The molecular weights of the polymers in the present invention are described by the melt index (ASTM D 1238), as is generally known in the art. The value of the melt index generally increases as the molecular weight decreases. Moreover, polymer molecular weight distributions were measured by gel permeation chromatography (GPC), the method of which is generally known in the art.

The products obtained by the method of polymerization of the present invention are solid ethylene homo-polymers or copolymers of ethylene and an α-olefin and exhibit excellent bulk density and fluidity. Since the yields of polymer are sufficiently high, there is no need for the removal of catalyst residues.

EXAMPLES AND COMPARATIVE EXAMPLES

The present invention is further described by means of the examples and comparative examples described below but should not be confined or limited to these examples.

Example 1

Production of Catalyst

A solid complex titanium catalyst was produced by means of the following three steps:
 (i) Production of a Magnesium Compound Solution
 A 1.0 L reactor equipped with a mechanical stirrer was purged with nitrogen followed by the addition of 9.5 g of $MgCl_2$ and 400 ml of decane. After stirring at 500 rpm, 77 ml of 2-ethyl hexanol was added to the reactor. The temperature was raised to 110° C., and the reaction was allowed to continue for three hours. A homogenous solution was obtained after the reaction and was cooled to room temperature (25° C.).
 (ii) Contact-Reaction of the Magnesium Solution with an Ester Containing a Hydroxyl Group and an Alkoxy Silane Compound
   1.2 ml of 2-hydroxyethyl methacrylate and 14.0 ml of silicon tetraethoxide were added to the cooled magnesium compound solution. The reaction was allowed to continue for an hour.
 (iii) Treating with a Mixture of a Titanium Compound and a Silicon Compound
   After adjusting the temperature of the solution to room temperature (25° C.), a solution mixture of 50 ml of titanium tetrachloride and 50 ml of silicon tetrachloride was dripped into the reactor over the course of one hour. After completing the dripping process, the temperature of the reactor was raised to 80° C. and maintained at that temperature for one hour. After stirring, the mixture was cooled to room temperature. The supernatant was removed and the remaining solid layer was mixed with 200 ml of decane and 200 ml of titanium tetrachloride. The temperature was raised to 100° C. and maintained for two hours. The mixture was then cooled to room temperature and was washed with 400 ml of hexane to remove the free unreacted $TiCl_4$. The titanium content of the solid catalyst so produced was 5.2 wt %.

Polymerization

A 2-L high-pressure reactor was dried in an oven and assembled while hot. In order to completely purge the reactor, the reactor was filled with nitrogen and evacuated three times. The reactor was filled with 1,000 ml of n-hexane, after which 1 mmol of triethylaluminum, 0.1 mmol of cyclohexylmethyldimethoxysilane, 0.05 mmol of chloroform ($CHCl_3$), and 0.03 mmol of the above solid catalyst in terms of titanium atoms were added thereto. 500 ml of hydrogen was then added. The temperature of the reactor was raised to 80° C. while stirring at 700 rpm. The pressure of ethylene was adjusted to 80 psi, and the polymerization was allowed to continue for an hour. After the polymerization, the temperature of the reactor was lowered to room temperature and an excess of ethanol was added to the reactor contents. The polymer thus produced was collected by separation and was dried in a vacuum oven at 50° C. for at least six hours, whereby polyethylene was obtained in the form of a white powder.

The polymerization activity (kg of polyethylene produced divided by gram of catalyst) was calculated as the weight (kg) ratio of the polymers produced to the amount of catalyst so used (gram of catalyst). The results of the polymerization are shown in Table 1 along with the polymer bulk density (g/ml), melt index (g/10 minutes), and molecular weight distribution (Mw/Mn).

Examples 2–10

The polymerization was performed in the same manner as in Example 1 with the catalyst produced in Example 1 using various alkoxysilanes and haloalkanes. The results of the polymerizations are shown in Table 1.

Comparative Example 1

With the catalyst produced in Example 1, the polymerization was carried out in the same manner as in Example 1, but without using alkoxysilanes and haloalkanes during the polymerization process of Example 1. The results are shown in Table 1.

Comparative Example 2

With the catalyst produced in Example 1, the polymerization was carried out in the same manner as in Example 1, using alkoxysilanes but without using haloalkanes during the polymerization process of Example 1. The results are shown in Table 1

Comparative Example 3

With the catalyst produced in Example 1, the polymerization was carried out in the same manner as in Example 1, using haloalkanes but without using alkoxysilanes during the polymerization process of Example 1. The results are shown in Table 1

TABLE 1

| Example | Alkoxysilane Compound Compound | Alkoxysilane Compound Amount (mmol) | Haloalkanes Compound | Haloalkanes Amount (mmol) | Activity (kg PE/g of catalyst) | Bulk Density (g/ml) | Molecular Weight Distribution (Mw/Mn) |
|---|---|---|---|---|---|---|---|
| 1 | A | 0.1 | CH-1 | 0.05 | 8.3 | 0.36 | 3.8 |
| 2 | B | 0.1 | CH-1 | 0.05 | 8.7 | 0.37 | 3.9 |
| 3 | C | 0.1 | CH-1 | 0.05 | 8.5 | 0.37 | 4.2 |
| 4 | B | 0.1 | CH-2 | 0.3 | 8.4 | 0.36 | 4.0 |
| 5 | B | 0.1 | CH-3 | 0.1 | 8.6 | 0.36 | 3.7 |
| 6 | B | 0.1 | CH-4 | 0.1 | 8.7 | 0.36 | 3.9 |
| 7 | B | 0.1 | CH-5 | 0.05 | 9.2 | 0.37 | 4.1 |
| 8 | B | 0.1 | CH-6 | 0.05 | 8.3 | 0.36 | 3.8 |
| 9 | C | 0.05 | CH-5 | 0.05 | 8.9 | 0.38 | 4.2 |
| 10 | B | 0.05 | CH-1 | 0.05 | 9.0 | 0.38 | 4.0 |
| CE 1 | — | — | — | — | 6.0 | 0.36 | 6.7 |
| CE 2 | — | — | — | — | 7.1 | 0.36 | 4.1 |
| CE 3 | — | — | — | — | 4.8 | 0.35 | 6.5 |

*Types of alkoxysilanes - A: cyclohexyldimethoxysilane, B: dicyclopentyldimethoxysilane, C: diisopropyldimethoxysilane;
*Types of haloalkanes - CH-1: chloroform, CH-2: ethylchloride, CH-3: tertiarybutylchloride, CH-4: dichloromethane, CH-5: cyclohexylchloride, CH-6: chlorobenzene;
*CE: comparative example.

As shown above, by way of the method for producing homo- and co-polymers of ethylene according to the present invention, it is possible to obtain homo- and co-polymers of ethylene, which have high bulk density and narrow molecular weight distribution, with high polymerization activity.

The invention claimed is:

1. A method for producing homo- and co-polymers of ethylene, comprising polymerization in the presence of:
   (a) a solid titanium catalyst produced by the method comprising:
      (i) preparing a magnesium compound solution by contact-reacting a halogenated magnesium compound with an alcohol;
      (ii) reacting the magnesium compound solution with electron donors, the electron donors comprising an ester compound having at least one hydroxyl group and a first silicon compound having at least one alkoxy group represented by the general formula $R_nSi(OR)_{4-n}$, wherein R is a hydrocarbon having 1–12 carbons, and wherein n is an integer from 0–3; and
      (iii) further reacting the mixture resulting from the reaction of the magnesium compound solution with electron donors with a titanium compound and a second silicon compound represented by the general formula $R_nSiCl_{4-n}$, wherein R is hydrogen, alkyl, alkoxy, haloalkyl, aryl group having 1–10 carbons, halosilyl, or halosilylaklyl group having 1–8 carbons, and wherein n is an integer from 0–3;
   (b) organometallic compounds of Group II or III of the Periodic Table; and
   (c) an alkoxysilane compound and a haloalkane compound.

2. The method of claim 1, wherein the ester compound having at least one hydroxyl group is an unsaturated aliphatic acid ester having at least one hydroxyl group, an aliphatic monoester or polyester having at least one hydroxyl group, an aromatic ester having at least one hydroxyl group, or an alicyclic ester having at least one hydroxyl group.

3. The method of claim 1, wherein the titanium compound is represented by a general formula of $Ti(OR)_aX_{4-a}$, wherein R comprises a hydrocarbon group, X comprises a halogen atom, and a is a natural number of 0–4.

4. The method of claim 1, wherein said titanium compound is a 4-halogenated titanium, a 3-halogenated alkoxytitanium, a 2-halogenated alkoxytitanium, or a tetralkoxytitanium.

5. The method of claim 1, wherein the titanium compound is titanium tetrachloride, and the second silicon compound is silicon tetrachloride.

6. The method of claim 1, further comprising producing the solid titanium catalyst by further reacting the product of step (a) (iii) with an additional titanium compound.

7. The method of claim 1, wherein the alkoxysilane compound is represented by a general formula of $R_nSi(OR)_{4-n}$, wherein R comprises a hydrocarbon having 1–20 carbons and n is an integer from 0 to 3.

8. The method of claim 1, wherein the alkoxysilane compound is an aromatic silane, an aliphatic silane, or a mixture thereof.

9. The method of claim 1, wherein the ester compound having at least one hydroxyl group is 2-hydroxy ethylacrylate, 2-hydroxy ethylmethacrylate, 2-hydroxy propyl acrylate, 2-hydroxy propylmethacrylate, 4-hydroxy butylacrylate, pentaerythritol tri-acrylate, 2-hydroxy ethyl acetate, methyl 3-hydroxy butylate, ethyl 3-hydroxy butylate, methyl 2-hydroxy isobutylate, ethyl 2-hydroxy isobutylate, methyl-3-hydroxy-2-methyl propionate, 2,2-dimethyl-3-hydroxy propionate, ethyl-6-hydroxy hexanoate, t-butyl-2-hydroxy isobutylate, diethyl-3-hydroxy glutarate, ethyl-lactate, isopropyl lactate, butyl isobutyl lactate, isobutyl lactate, ethyl mandelate, dimethyl ethyl tartrate, ethyl tartrate, dibutyl tartrate, diethyl citrate, triethyl citrate, ethyl-2-hydroxycaproate, diethyl bis-(hydroxymethyl) malonate, 2-hydroxy ethyl benzoate, 2-hydroxy ethyl salicylate, methyl-4-(hydroxy methyl)benzoate, methyl-4-hydroxy benzoate, ethyl-3-hydroxy benzoate, 4-methyl salicylate, ethyl salicylate, phenyl salicylate, propyl-4-hydroxy benzoate, phenyl 3-hydroxy naphthanoate, monoethylene glycol monobenzoate, diethylene glycol monobenzoate, triethylene glycol monobenzoate or hydroxy butyl-lactone.

10. The method of claim 1, wherein the first silicon compound having at least one alkoxy group is dimethyldimethoxysilane, dimethyldiethoxysilane, diphenyldimethoxysilane, methylphenyldimethoxysilane, diphenyldiethoxysilane, ethyltrimethoxysilane, vinyltrimethoxysilane, methyltrimethoxysilane, phenyltrimethoxysilane, methyltriethoxysilane, ethyltriethoxysilane, vinyltriethoxysilane, butyltriethoxysilane, phenyltriethoxysilane, ethyltriisopropoxysilane, vinyltributoxysilane, ethylsilicate, butylsilicate, or methyltriaryloxysilane.

11. The method of claim 1, wherein the titanium compound is $TiCl_4$, $TiBr_4$, $TiI_4$, $Ti(OCH_3)Cl_3$, $Ti(OC_2H_5)Cl_3$, $Ti(OC_2H_5)Br_3$, $Ti(O(i-C_4H_9))Br_3$, $Ti(OCH_3)_2Cl_2$, $Ti(OC_2H_5)_2Cl_2$, $Ti(O(i-C_4H_9))_2Cl_2$, $Ti(OC_2H_5)_2Br_2$, $Ti(OCH_3)_4$, $Ti(OC_2H_5)_4$, or $Ti(OC_4H_9)_4$.

12. The method of claim 1, wherein the second silicon compound is silicon tetrachloride, a trichlorosilane, a trichlorosilane, or a monochlorosilane.

13. The method of claim 1, wherein the second silicon compound is methyltrichlorosilane, ethyltrichlorosilane, phenyl-trichlorosilane, dimethyldichlorosilane, diethyldichlorosilane, diphenyldichlorosilane, methylphenyldichlorosilane, or trimethylchlorosilane.

14. The method of claim 1, wherein the haloalkane compound comprises a compound having 1–20 carbon atoms and at least one halogen.

15. The method of claim 1, wherein the alkoxysilane compound is diphenyldimethoxysilane, phenyltrimethoxysilane, phenylethyldimethoxysilane, phenylmethyldimethoxysilane, isobutyltrimethoxysilane, diisobutyldimethoxysilane, diisopropyldimethoxysilane, di-t-butyldimethoxysilane, t-butyltrimethoxysilane, cyclohexylmethyldimethoxysilane, dicyclopentyldimethoxysilane, dicyclohexyldimethoxysilane, 2-norbornan-triethoxysilane, 2-norbornan-methyldimethoxysilane, vinyltriethoxysilane, or a mixture thereof.

16. The method of claim 1, wherein the haloalkane compound is monochloromethane, dichloromethane, trichloromethane, tetrachloromethane, monochloroethane, 1,2-dichloroethane, monochloropropane, monochlorobutane, monochloro-secondary-butane, monochloro-tertiary-butane, monochlorocyclohexane, chlorobenzene, monobromomethane, monobromopropane, monobromobutane, monoiodomethane, or a mixture thereof.

* * * * *